June 25, 1946.   B. DE H. MILLER   2,402,905
MIXING APPARATUS
Filed Sept. 14, 1943
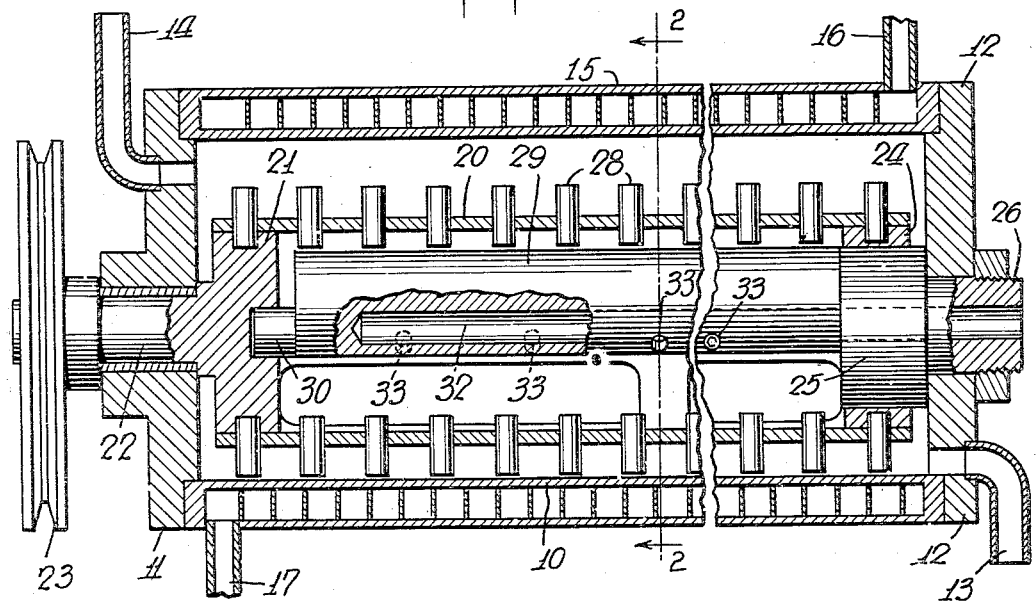
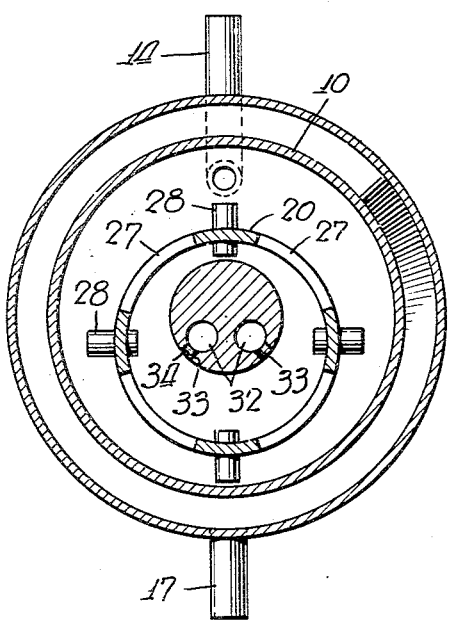
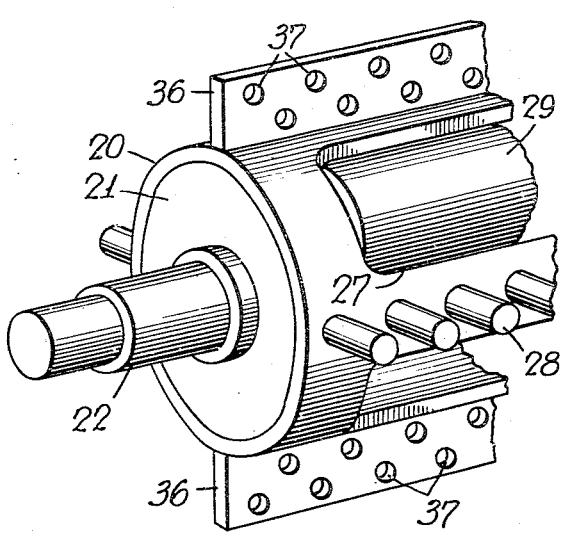
INVENTOR
*Bruce De Haven Miller*
BY
*Dean Fairbank & Hirsch*
ATTORNEYS Patented June 25, 1946

2,402,905

UNITED STATES PATENT OFFICE 2,402,905

MIXING APPARATUS

Bruce De Haven Miller, Louisville, Ky., assignor to The Girdler Corporation, Louisville, Ky., a corporation of Delaware Application September 14, 1943, Serial No. 502,273

11 Claims. (Cl. 259—6)

This invention relates to the treatment of fluid, plastic, or other flowable material composed of two or more ingredients which are not miscible, or at least not readily miscible, or in one of which it is desired to secure a rapid, uniform and thorough dispersion of one or more other ingredients, as in making an emulsion, or where chemical reaction between different ingredients is desired, but at a controlled rate.

This invention is an improvement in mixing apparatus of the type in which the material being processed may be continuously passed through a chamber and simultaneously mixed, agitated, emulsified, or otherwise treated. The agitating mechanism is of the rotary type and the processing may be merely that resulting from the action of the agitator or may also include temperature change, or maintenance, and/or the addition of an ingredient to another ingredient or to a mixture of ingredients at the desired point or points in the path of flow through the processing chamber.

As an important feature of the invention there are provided a plurality of chambers in communication with each other and in which the material is treated. In the preferred embodiment of the invention the agitator is eccentrically positioned in respect to the processing chambers, as set forth and claimed in my copending application Serial No. 502,272, filed on even date herewith.

So far as certain aspects of the invention are concerned the agitator may be of other types, and may be concentrically rather than eccentrically positioned.

As an important feature of the invention the processing chambers are disposed one inside of the other, and communication between the chambers is such that there may be a continuous flow of the material lengthwise of the chamber during the turbulent and circumferential flow in the chambers.

As a further important feature the dividing wall between the chambers may be formed as a part of the agitator, so that one chamber is formed inside of the agitator and around a central core.

As a further feature the cylindrical wall dividing the chambers may have apertures therein, so that material may flow back and forth from one chamber to the other during its general lengthwise movement in the same direction in both chambers.

As a further feature, provision is made for the addition of an ingredient of the mixture at a plurality of spaced points along the length of one of the chambers.

Various other novel features will be apparent from or will be pointed out in connection with the following description of certain embodiments of the invention.

In the accompanying drawing:

Fig. 1 is a central longitudinal section through an apparatus embodying my invention.

Fig. 2 is a transverse section on the line 2—2 of Fig. 1, and

Fig. 3 is a perspective view of an end portion of a type of agitator which may be employed in place of that shown in Fig. 1.

In the construction shown in Figs. 1 and 2, there is provided a processing chamber having a cylindrical peripheral wall 10 and end walls 11 and 12, the end wall 12 having an outlet 13 for the processed material and the end wall 11 having an inlet 14 for the material to be processed. The material while being agitated as hereinafter described has a substantially uniform rate of continuous bodily flow longitudinally through the processing zone, in addition to the annular and turbulent flow caused by the agitator. Thus successive portions of the material will all remain in the chamber and be processed for substantially the same length of time.

The inlet may be connected to a supply pump drawing the material from a premixing tank or in controlled ratio from separate supply pipes for the different ingredients, or in some cases the end wall may be provided with a plurality of inlets for the different ingredients and through which such ingredients are delivered at controlled rates and in controlled relative proportions by pumps or other forcing means. The outlet 13, or a conduit connected thereto, may be provided with throttling or flow controlling means whereby any desired superatmospheric pressure may be maintained in the processing chamber.

If it is desired to change the temperature of the material as a part of the processing, or to maintain a given temperature if the processing involves an exothermic or endothermic reaction, there may be provided a jacket 15 for a heat transfer medium. The annular space between the jacket and the wall 10 may be provided with an inlet 16 at one end and an outlet 17 at the opposite end. The space between the walls 10 and 15 and between the inlet and the outlet may be provided with a helical baffle which will prevent short circuiting of the heat transfer medium from the inlet to the outlet and cause it to flow in a helical path around the processing chamber.

Within the main processing chamber there is mounted an agitator having a hollow shaft 20 and an end wall 21 provided with an extension or stub shaft 22 which may be connected to any suitable means, such as a pulley 23, for rotating the agitator at the desired speed. At the opposite end the peripheral wall of the hollow shaft is provided with a bearing section or collar 24 journaled on a stationary cylindrical block or end wall 25 which is mounted on the end wall 12 and preferably has a projection 26 extending through said end wall and rigidly clamped thereto.

As an important feature of the invention the peripheral wall 20, together with the end walls 21 and 25, subdivide the interior of the apparatus into two processing chambers, one outside of and the other inside of the wall 20. These two chambers communicate through a series of comparatively large ports or slots 27 extending along substantially the entire length of this wall 20. Thus the two chambers are in open communication with each other.

The peripheral wall of the hollow shaft is provided with a plurality of beater or impact elements which may comprise pins or projections 28 extending radially therefrom. Although these pins are illustrated as cylindrical, the particular shape of them is not important, except that ordinarily they are of such a character that they do not either substantially impede or aid the endwise flow in the chambers. The impact members or beater elements which extend into the chamber outside of the wall 20 may be integral with, or separate from those which project into the chamber encircled by the wall 20. The agitator is eccentrically mounted in respect to the outer chamber wall 10, and the beater elements are of such length that they extend nearly to but not into contact with said wall on the side toward which the axis of the agitator is offset, but they come at a substantial distance from said wall at the opposite side of the outer chamber.

Inside of the hollow shaft, that is, within the inner chamber, there is provided a stationary core 29 which may be formed integral with the end wall 25, and may be supported at the other end by a pin 30 set in a recess in the center of the end wall 21. This core has a smooth outer surface and preferably has a diameter equal to about one-half the diameter of the outer wall 20 of the inner chamber. The body of the core is eccentrically disposed in respect to the inner chamber, and therefore in respect to the agitator shaft wall 20, but is preferably substantially concentric with the outer chamber wall 10. The impact or beater elements 28 extend into the inner chamber to such a distance that they come closely adjacent to but do not actually contact with one side of the core 29, and are spaced to a substantial distance from the opposite side, as will clearly appear from the drawings. The impact members are preferably arranged in rows longitudinally of the agitator, and are alternately spaced with the ports 27. By having the core 29 concentric with the outer wall 10, and by having the wall 20 of the agitator eccentric in respect to both the core and said peripheral wall, it will be noted that the space in the inner chamber is widest on the side of the core where the space outside of the wall 10 is narrowest, and vice versa. Thus, as the agitator is rotated, the material is caused not only to swirl around the agitator shell and around the core inside of said shell, but is also caused to flow back and forth through the ports in the shell or wall 20. By this combined swirling, surging and beating action, the material is thoroughly and uniformly mixed and emulsified or otherwise processed, and the endwise flow of material through the apparatus, that is, from the inlet 14 to the outlet 13, may be at a comparatively high speed in respect to the size of the apparatus. Because of this effective intermixing, an apparatus of very much smaller size may be employed for processing a given volume of material per hour.

It will be noted that when the wall 20 is rotating in a clockwise direction, as viewed in Fig. 2, the material directly above the core will be flowing circumferentially of the core, but will be thrown out through a port 27 into the outer chamber where the agitator is moving the material downwardly through the lower portion of the outer chamber. The material in the lower portion of the outer chamber will be moved primarily circumferentially by the impact members, but eddy currents will carry a considerable portion of the material through ports 27 into the inner chamber. Thus, there is a continuous flow in and out through the ports, a high circumferential velocity at the lower portion of the outer chamber, a high circumferential velocity in the upper part of the inner chamber, and a turbulent flow at all points, which causes a thorough intermixing of the ingredients.

In some cases two materials which are to be mixed, emulsified, or otherwise processed, may be preliminarily mixed and delivered together through the inlet 14, or they may be delivered separately through two spaced or closely adjacent inlet ports in the end wall 11.

If it is desired that there be a preliminary agitation of one of the materials before the addition of a second one, or if it be desired that two ingredients be thoroughly mixed before a third ingredient is added, such second or final ingredient may be delivered through one or more passages 32 in the core 29. These passages may have ports 33 distributed along the length thereof, so that the added ingredient or ingredients may be introduced at separate points and progressively intermixed with the other materials. The ports 33 may be provided with removable plugs 34 so that the added material may be delivered only adjacent to the inlet end of the chamber, or only adjacent to the opposite end, and the plugs may have passages therethrough of varying sizes, or of such size as will cause the jets of fluid to be projected into the mixture, if the material supplied through the passages 32 be under pressure.

As previously noted, the impact members may be of various kinds, shapes or dimensions. In Fig. 3 the impact members are shown as two diametrically opposed rows of pins 28 similar to those shown in Figs. 1 and 2, and a pair of plates 36 provided with apertures 37, through which the material may backflow in a way analogous to the backflow between adjacent pins when the agitator is rotated at high speed.

Having thus described my invention, what I claim as new and desire to secure by Letters Patent is:

1. A processing apparatus comprising an outer chamber, a hollow cylindrical agitator mounted for rotation about a fixed axis eccentrically disposed within said outer chamber and providing an inner chamber, said agitator having openings therethrough connecting said inner and outer chambers, a plurality of beater elements carried by and rigid with the peripheral wall of said agitator, and extending into both said chambers, a stationary core eccentrically disposed within said inner chamber and extending throughout substantially the length thereof, and means disposed at opposite ends of said outer chamber adapted as entry and exit means for processable materials.

2. A processing apparatus as defined in claim 1 and in which the core has a liquid supply passage extending lengthwise thereof and having ports communicating with the inner chamber.

3. A processing apparatus including a chamber having a substantially cylindrical wall, an agitator having a cylindrical wall eccentrically disposed in respect to said first mentioned wall to form therewith an outer chamber, beater members carried by said agitator wall, and a stationary core extending within said agitator and spaced from said beater members to form with said agitator wall an inner chamber, said chambers being in communication with each other.

4. A processing apparatus including a chamber having a substantially cylindrical wall, an agitator having a cylindrical wall eccentrically disposed in respect to said first mentioned wall, beater members carried by said agitator wall, and a core extending within said agitator and spaced from said beater members, said core having a passage provided with ports along the length thereof and communicating with the space in said agitator.

5. A processing apparatus including a chamber having a substantially elongated cylindrical wall, and a rotatable agitator within said chamber and having its axis parallel to and eccentrically disposed in respect to said wall, said agitator being hollow and having beater elements rigid therewith and extending outwardly and inwardly from the peripheral portion, and having ports therethrough between said beater elements, said apparatus having an inlet at one end and an outlet at the opposite end for the continuous flow of material into, lengthwise of, and out of said apparatus.

6. A processing apparatus including a chamber having a substantially elongated cylindrical peripheral wall, a ported rotatable agitator having a substantially cylindrical peripheral wall within said chamber and eccentrically disposed in respect to said first mentioned wall, said agitator wall having outwardly and inwardly extending beater elements rigid therewith, and a core encircled by and eccentrically disposed in respect to said agitator, said apparatus having an inlet at one end and an outlet at the opposite end for the continuous flow of material into, lengthwise of, and out of said apparatus.

7. A processing chamber having an outer elongated cylindrical wall, an annular ported agitating member mounted for rotation about a fixed axis eccentrically disposed within said outer wall to form therewith an outer chamber, and a stationary core extending throughout substantially the length of, within, and eccentrically disposed in respect to said member, said core presenting a smooth peripheral surface forming with said member an inner chamber, said apparatus having an inlet at one end and an outlet at the opposite end for the continuous flow of material into, generally lengthwise of, and out of both of said chambers, and said agitating member having outwardly and inwardly extending beater elements in said chambers, and which alternately approach and recede from said wall and said surface during rotation of said agitator.

8. A processing apparatus having a pair of generally cylindrical substantially concentric walls and a generally cylindrical ported rotatable agitator eccentrically disposed between said walls and encircling the inner wall to separate the space between said walls into an outer and an inner chamber communicating with each other through the ports of said agitator, said agitator having outwardly and inwardly extending beater elements in said chambers respectively, and which alternately approach and recede from each of said walls during rotation of said agitator.

9. A processing apparatus having a cylindrical outer wall, a core extending substantially the full length thereof and encircled thereby, an annular rotatable agitator member between said wall and said core, encircling said core and eccentrically disposed in respect to both said wall and said core, and forming with said wall and said core inner and outer annular chambers, said member having beater elements rigid therewith and extending into both of said chambers, said apparatus having an inlet and an outlet means at opposite ends thereof permitting the continuous delivery of material to, through, and out of both of said chambers.

10. A processing apparatus having a cylindrical outer wall, a core extending substantially the full length thereof and encircled thereby, an annular rotatable agitator member between said wall and said core, encircling said core and eccentrically disposed in respect to both said wall and said core, and forming with said wall and said core inner and outer annular chambers, said member having beater elements rigid therewith and extending into both of said chambers, and means establishing communication between said chambers, said apparatus having an inlet and an outlet means at opposite ends thereof permitting the continuous delivery of material to, through, and out of both of said chambers.

11. An apparatus for processing material flowing continuously therethrough, comprising an axially elongated processing chamber having a generally cylindrical peripheral wall, an axially elongated hollow agitator including a generally cylindrical wall rotatable in said chamber about a fixed axis extending substantially parallel with but eccentrically disposed in respect to said chamber wall, said agitator wall having a plurality of ports therethrough affording communication between the spaces located respectively interiorly and exteriorly of the agitator wall, said agitator also having a multiplicity of beater elements rigid therewith and distributed lengthwise of and circumferentially around the agitator wall and projecting inwardly and outwardly respectively into said spaces but free of contact with said peripheral wall, and means providing an inlet and an outlet adjacent the opposite ends respectively of said chamber for the flow of material continuously into, lengthwise therethrough, and out of said chamber.

BRUCE DE HAVEN MILLER.